(12) United States Patent
Chen et al.

(10) Patent No.: US 8,325,331 B2
(45) Date of Patent: Dec. 4, 2012

(54) METHOD FOR OBTAINING INCIDENT ANGLE

(75) Inventors: Sheng Chung Chen, Jhudong Township, Hsinchu County (TW); Chin Yi Wu, Jhudong Township, Hsinchu County (TW)

(73) Assignee: Arcadyan Technology Corp., Hsinchu (TW)

( * ) Notice: Subject to any disclaimer, the term of this patent is extended or adjusted under 35 U.S.C. 154(b) by 317 days.

(21) Appl. No.: 12/568,173

(22) Filed: Sep. 28, 2009

(65) Prior Publication Data

US 2010/0165331 A1 Jul. 1, 2010

(30) Foreign Application Priority Data

Dec. 30, 2008 (TW) ............................... 97151500 A (51) Int. Cl.
*G01B 11/26* (2006.01)
(52) U.S. Cl. ........ 356/138; 356/614; 356/604; 356/605; 356/237.2
(58) Field of Classification Search ................. 356/138, 356/614, 401
See application file for complete search history.

(56) References Cited

U.S. PATENT DOCUMENTS

| 4,803,371 | A | * | 2/1989 | Durland | ................... | 250/559.2 |
| 7,237,930 | B2 | * | 7/2007 | Onishi et al. | ................ | 362/333 |
| 7,556,393 | B2 | * | 7/2009 | Onishi et al. | ................ | 362/97.1 |

FOREIGN PATENT DOCUMENTS

| CN | 2227369 Y | 5/1996 |
| CN | 1683968 A | 10/2005 |

OTHER PUBLICATIONS

Office Action for Chinese Application No. 200910003093.2, dated May 9, 2011.

* cited by examiner

*Primary Examiner* — Tarifur Chowdhury
*Assistant Examiner* — Isiaka Akanbi
(74) *Attorney, Agent, or Firm* — Alston & Bird LLP (57) ABSTRACT

A method for obtaining an incident angle $\theta_i$ is provided. The method is used in a panel having at least one icon, wherein the at least one icon has a plurality of protrusions, and a light-emitting source is disposed under the at least one icon. The method includes steps of obtaining a distance W between two centers of two bottoms of two trenches formed at two sides of one of the plurality of protrusions; obtaining a half of the distance W; obtaining a vertical distance H between the light-emitting source and a center of the distance W; and performing an inverse trigonometric function operation for the half of the distance W over the vertical distance H so as to obtain the incident angle $\theta_i$.

16 Claims, 8 Drawing Sheets

METHOD FOR OBTAINING INCIDENT ANGLE

FIELD OF THE INVENTION

The present invention relates to a method for obtaining an angle, and more particularly to a method for obtaining an incident angle.

BACKGROUND OF THE INVENTION

The graphical user interface (GUI) is an interface for interaction between the user and the electronic device such as a computer, an MP3 player, a household appliance, etc. Typically, the graphical user interface provides various icons, symbols, word interfaces, or a combination thereof as a visual indicator for the user to understand the associated information of the electronic device currently in use.

The graphical user interface configured on the electronic device in the market uses an object, a picture or a particular mark as the icon or symbol, which relates to an event currently performed in the electronic device or the information of the event.

Figure 1:
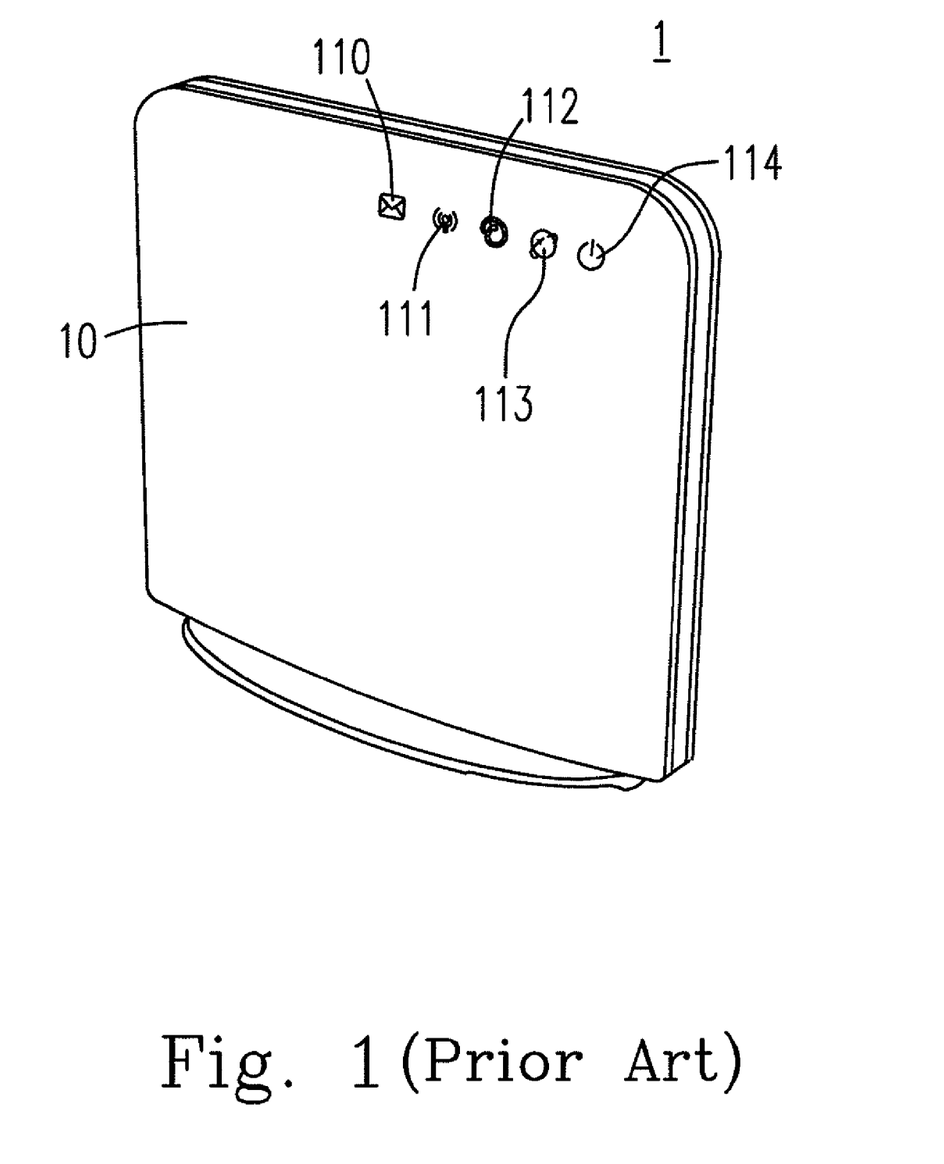
FIG. 1 shows the panel with a graphical user interface configured on a network communication device in the prior art.

Please refer to FIG. 1, which shows the panel with a graphical user interface configured on a network communication device in the prior art. The network communication device 1 includes a panel 10 with a graphical user interface. Through the panel 10 with the graphical user interface, the user can understand the current operating statuses of the network communication device 1 or perform the required function for the network communication device 1. The graphical user interface on the panel 10 includes a first icon 110, a second icon 111, a third icon 112, a fourth icon 113 and a fifth icon 114. The first icon 110 represents an electronic mail, the second icon 111 represents a wireless network, the third icon 112 represents a 3G network, the fourth icon 113 represents the internet and the fifth icon 114 represents the power supply.

Figure 2:
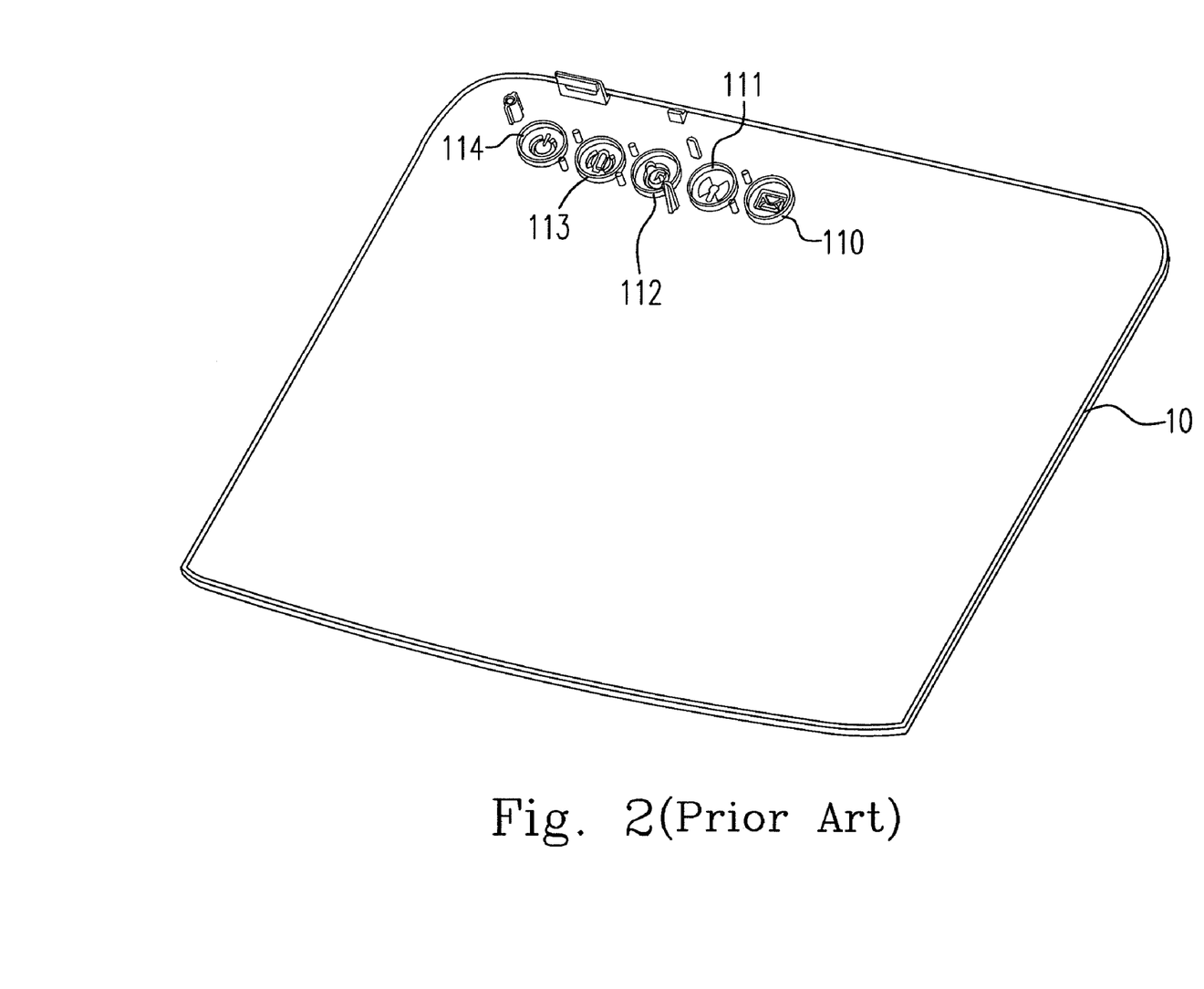
FIG. 2 shows the icons with different types of indentations formed at the back of the panel made of plastics.

Please refer to FIG. 2, which shows the icons with different types of indentations formed at the back of the panel made of plastics. As shown in FIG. 2, the icons with different types of indentations formed at the back of the panel 10 are identical to the icons formed at the front thereof.

Figure 3:
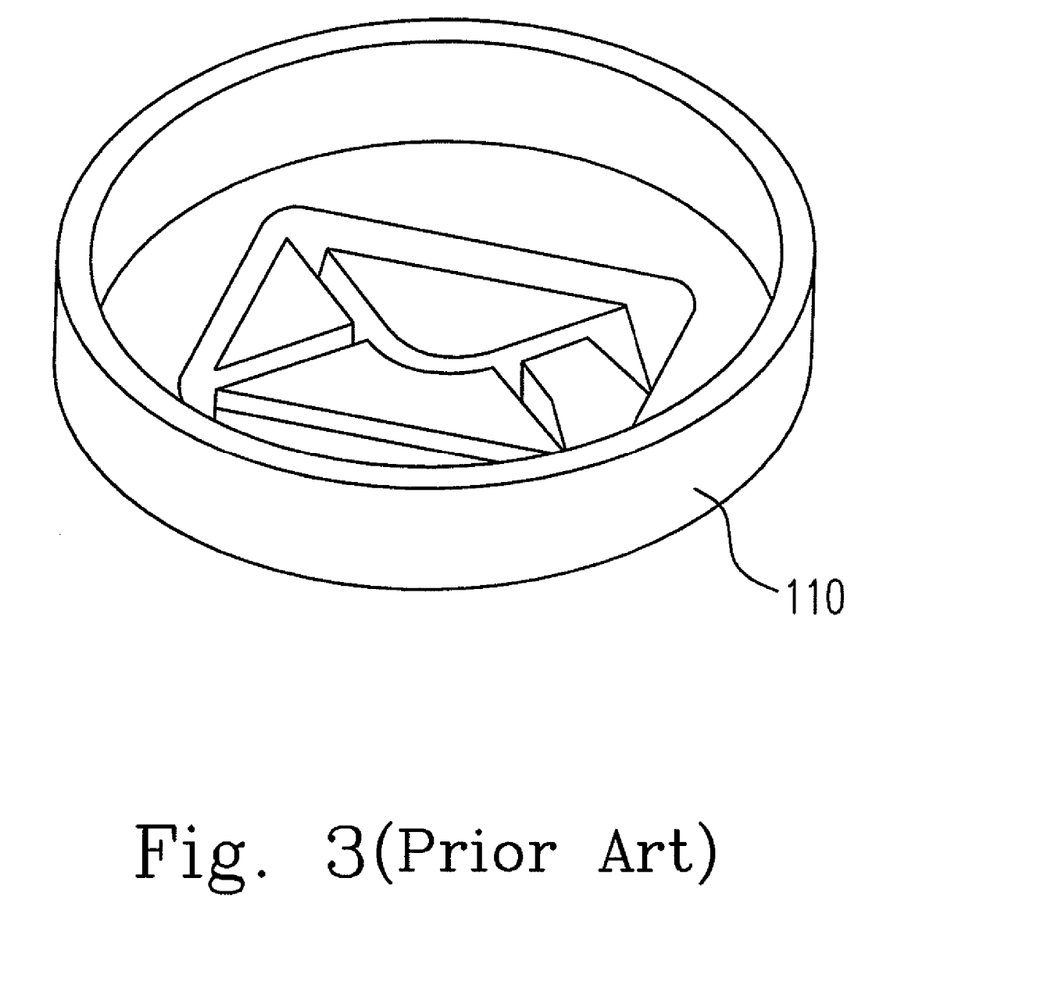
FIG. 3 shows the icon representing an electronic mail.

Please refer to FIG. 3, which shows the icon representing an electronic mail. The icon 110 representing an electronic mail has four triangular protrusions. These protrusions are formed by being processed with the computer numerical control (CNC) step in the plastic mold manufacturing process.

Figure 4:
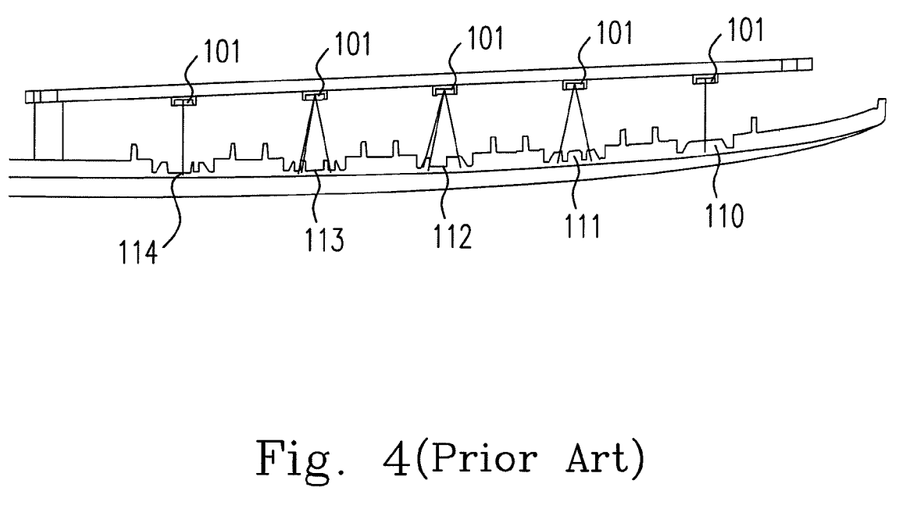
FIG. 4 shows the relationship between the red light-emitting diodes and the icons.

In the network communication device 1, a plurality of red light-emitting diodes are disposed for generating light to project on the corresponding icons, thereby showing the statuses of the network communication device 1. Please refer to FIG. 4, which shows the structural relationship between the red light-emitting diodes and the icons. As shown in FIG. 4, five red light-emitting diodes 101 are disposed under the five icons 110, 111, 112, 113, 114 by a predetermined height.

There are many draft angles at the inner and the outer sides of the edges of each triangular protrusion of the icon 110 representing an electronic mail. In the manufacturing process of the plastic product, the draft angle is an inclined angle designed at the inner and the outer sides of the edges of the plastic product for facilitating it to be drawn out from the mold.

When the network communication device 1 is powered on, the red light-emitting diodes 101 are switched on to generate red beams. Please refer to FIG. 5, which shows how the incident angle $\theta_i$ is defined. The incident angle $\theta_i$ is formed at the inner side of the edge of each protrusion 5 of the icon 110 representing an electronic mail. The incident angle $\theta_i$ is the angle defined by the intersection of an optic axis (op), which is formed between the inner side of the edge of the protrusion 5 of the icon 110 and the red light-emitting diode 101, and a normal (N). In the manufacturing process of the plastic product, the draft angle is equal to or larger than the incident angle $\theta_i$.

Figure 5:
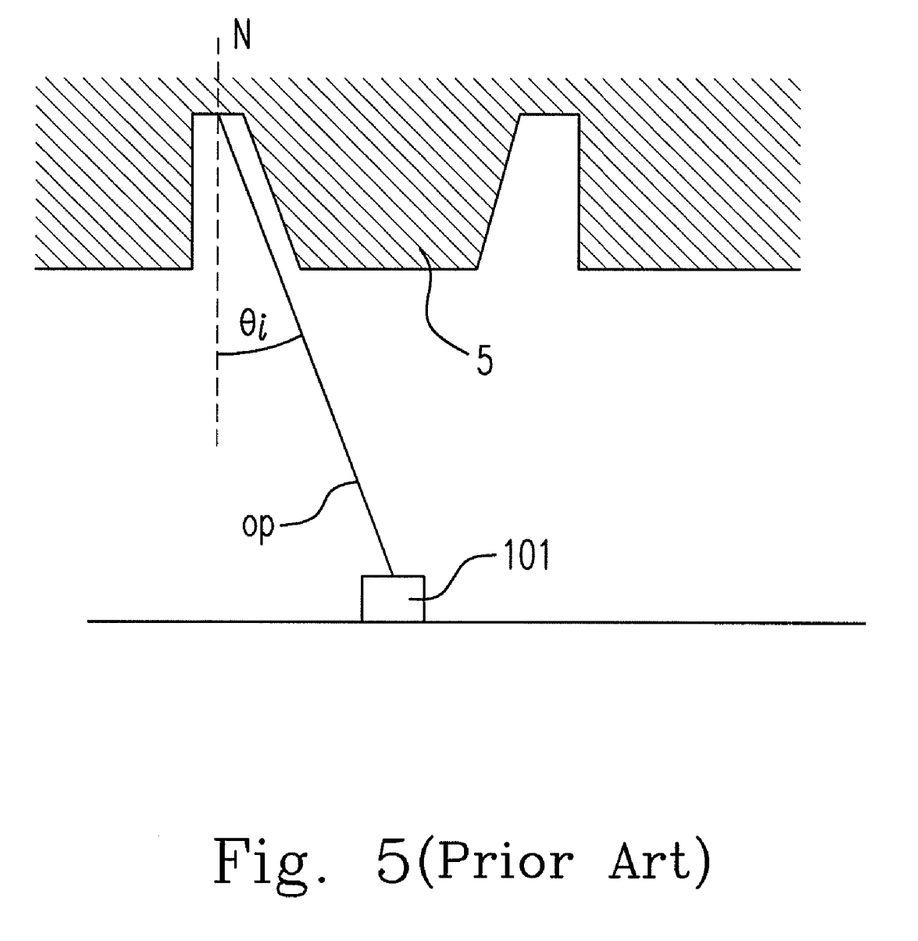
FIG. 5 shows how the incident angle $\theta_i$ is defined.

Unfortunately, due to the limitation for the panel thickness in the manufacturing process of the network communication device 1, the space for the light-emitting source is constricted, which makes the incident angle $\theta_i$ smaller. Therefore, when the light from the red light-emitting diode 101 illuminates the surface of the protrusion 5, the reflecting angle thereof is smaller. This makes the light on the icons 110, 111, 112, 113, 114 of the panel 10 uneven.

In order to overcome the drawbacks in the prior art, a method for obtaining an incident angle is provided. The particular design in the present invention not only solves the problems described above, but also is easy to be implemented. Thus, the present invention has the utility for the industry.

SUMMARY OF THE INVENTION

In accordance with one aspect of the present invention, a method for obtaining an incident angle $\theta_i$ is provided. The method is used in a panel having at least one icon, wherein the at least one icon has a plurality of protrusions, and a light-emitting source is disposed under the at least one icon. The method includes steps of obtaining a distance W between two centers of two bottoms of two trenches formed at two sides of one of the plurality of protrusions; obtaining a half of the distance W; obtaining a vertical distance H between the light-emitting source and a center of the distance W; and performing an inverse trigonometric function operation for the half of the distance W over the vertical distance H so as to obtain the incident angle $\theta_i$.

Preferably, the at least one icon is one selected from a group consisting of a numeral, a character, a symbol and a combination thereof.

Preferably, the light-emitting source is a light-emitting diode.

Preferably, the distance W is a horizontal distance.

Preferably, the distance W is ranged from 6 mm to 12 mm.

Preferably, the vertical distance H is ranged from 5 mm to 10 mm.

Preferably, when an arctangent function is used in the inverse trigonometric function operation, $\theta_i = \mathrm{Tan}^{-1}(W/2)/H$.

Preferably, the step of performing the inverse trigonometric function operation is performed by using an electronic operational device.

Preferably, the incident angle $\theta_i$ is ranged from 30 degrees to 45 degrees.

In accordance with another aspect of the present invention, a method for obtaining an incident angle $\theta_i$ is provided. The method is used in a panel having at least one icon, wherein the at least one icon has a plurality of protrusions, and a light-emitting source is disposed under the at least one icon. The method includes steps of obtaining a distance W between two centers of two bottoms of two trenches formed at two sides of one of the plurality of protrusions; obtaining a half of the distance W; obtaining a vertical distance H between the light-emitting source and a center of the distance W; and calculating the incident angle $\theta_i$ based on the half of the distance W and the vertical distance H.

Preferably, the at least one icon is one selected from a group consisting of a numeral, a character, a symbol and a combination thereof.

Preferably, the light-emitting source is a light-emitting diode.

Preferably, the distance W is ranged from 6 mm to 12 mm.

Preferably, the vertical distance H is ranged from 5 mm to 10 mm.

Preferably, the step of calculating the incident angle $\theta_i$, is performed by using an electronic operational device.

Preferably, the incident angle $\theta_i$ is ranged from 30 degrees to 45 degrees.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 6:
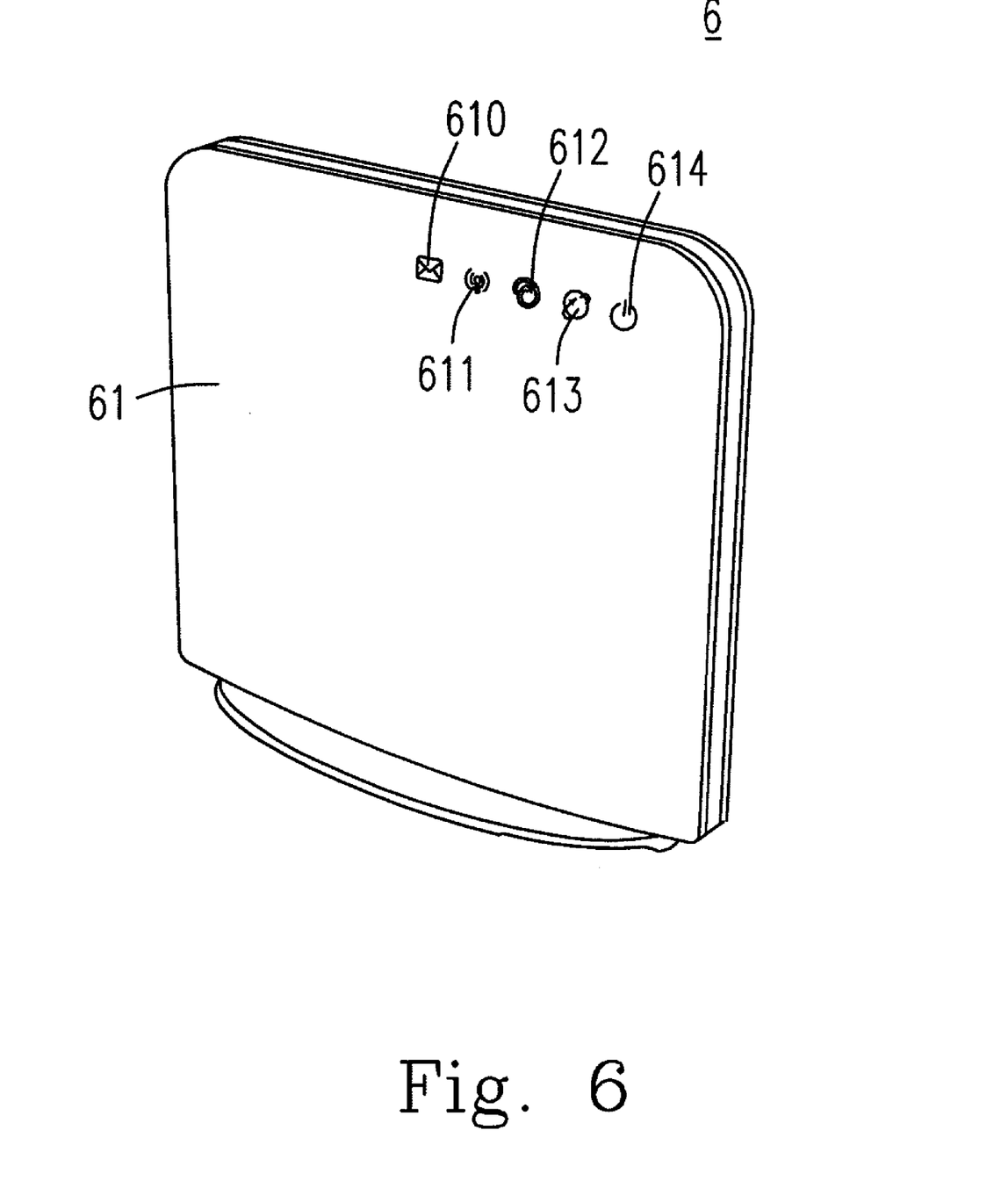
FIG. 6 shows the panel with a graphical user interface configured on a network communication device according to the present invention.

Please refer to FIG. 6, which shows the panel with a graphical user interface configured on a network communication device according to the present invention. The graphical user interface provides various icons, symbols, word interfaces, or a combination thereof as a visual indicator for the user to understand the associated information of the network communication device 6 currently in use.

As shown in FIG. 6, the graphical user interface on the panel 61 includes a first icon 610, a second icon 611, a third icon 612, a fourth icon 613 and a fifth icon 614. The first icon 610 represents an electronic mail, the second icon 611 represents a wireless network, the third icon 612 represents a 3G network, the fourth icon 613 represents the internet and the fifth icon 614 represents the power supply.

In this embodiment, the first icon 610 representing an electronic mail is taken as an example to illustrate the present invention.

Figure 7:
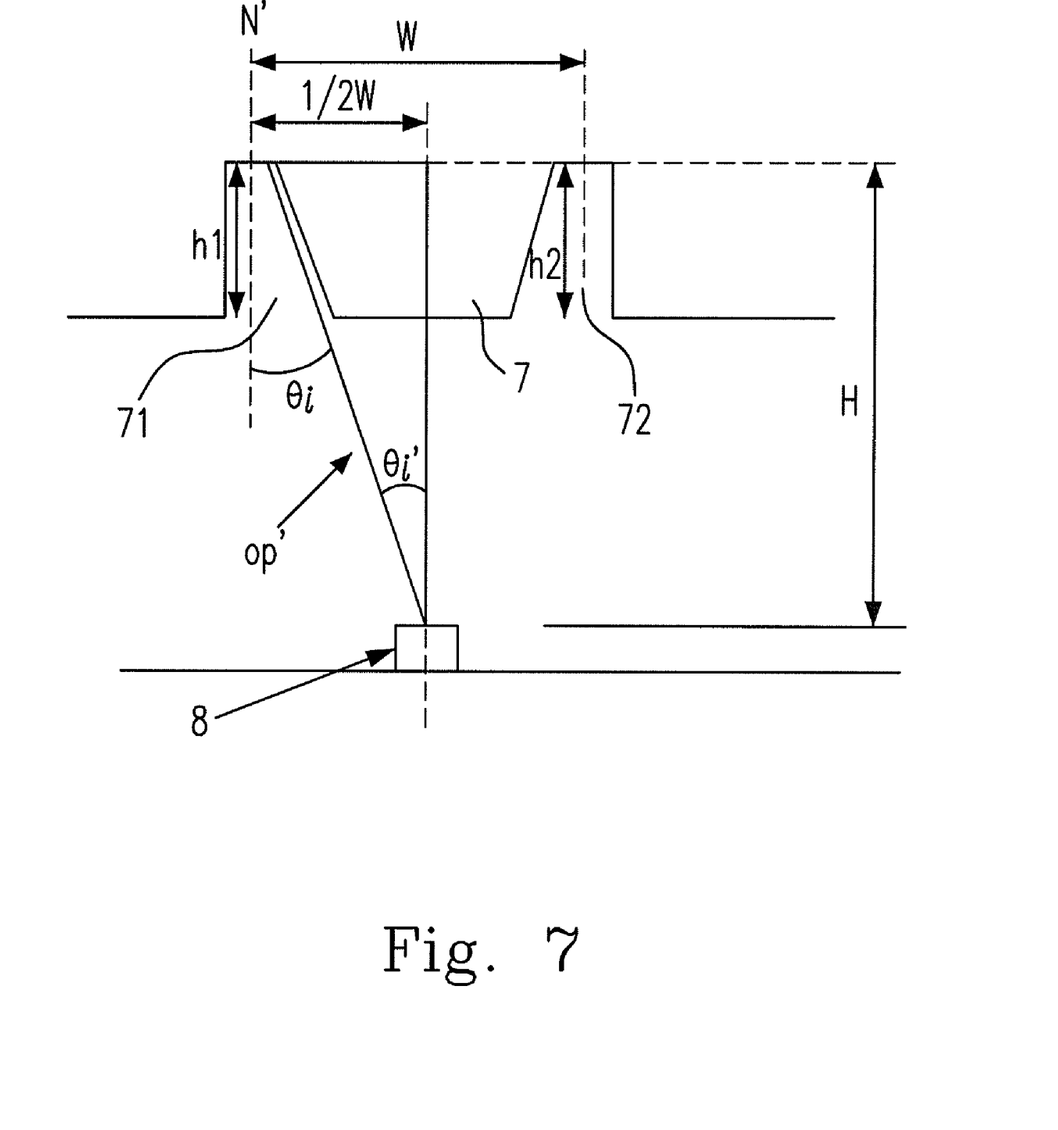
FIG. 7 is a cross-sectional view of the icon representing an electronic mail according to a preferred embodiment of the present invention.

Please refer to FIG. 7, which is a cross-sectional view of the icon representing an electronic mail according to a preferred embodiment of the present invention. As shown in FIG. 7, the protrusion 7 is ladder-shaped in a cross-sectional view. A first trench 71 with a depth h1 and a second trench 72 with a depth h2 are formed at two sides of the protrusion 7 respectively, wherein h1 is equal to h2.

In the network communication device 6, a plurality of red light-emitting diodes 8 are disposed for generating light to project on the corresponding icons, thereby showing the statuses of the network communication device 6.

There are many draft angles at the inner and the outer sides of the edges of each protrusion 7 of the icon 610 representing an electronic mail. In the manufacturing process of the plastic product, the draft angle is an inclined angle designed at the inner and the outer sides of the edges of the plastic product for facilitating it to be drawn out from the mold.

When the network communication device 6 is powered on, the red light-emitting diodes 8 are switched on to generate red beams. An incident angle $\theta_i$ is formed at the inner side of the edge of each protrusion 7 of the icon 110 representing an electronic mail. As shown in FIG. 7, the incident angle $\theta_i$ is the angle defined by the intersection of an optic axis (op'), which is formed between the inner side of the edge of the protrusion 7 of the icon 110 and the red light-emitting diode 8, and a normal (N'). In the manufacturing process of the plastic product, the draft angle is equal to or larger than the incident angle $\theta_i$.

If the designer wants to obtain a proper incident angle, he may use a mathematical function, preferably a trigonometric function such as a sine function, a cosine function, a tangent function, a cotangent function, a secant function or a cosecant function. In this embodiment, the tangent function is taken as an example to illustrate the present invention. The steps of using the tangent function to calculate the incident angle $\theta_i$ are described as follows.

In this embodiment, two adjacent sides are required for the tangent function. One is a half of the distance W (W/2) between two centers of two bottoms of two trenches formed at two sides of the protrusion 7, and the other is a vertical distance H between the light-emitting diode 8 and the center of the distance W. In this embodiment, the distance W is ranged from 6 mm to 12 mm, and the vertical distance H is ranged from 5 mm to 10 mm.

Assuming that the vertical distance H is 10 mm and a half of the distance W (W/2) is 6 mm, an arctangent function operation is performed for obtaining the incident angle $\theta_i$, as shown in Equation 1.

$$\theta_i = \mathrm{Tan}^{-1}(W/2)/H \qquad \text{Equation 1}$$

The arctangent function operation can be performed by using an electronic operational device such as a computer or an electronic calculator having a trigonometric function calculating capability, etc.

Figure 8:
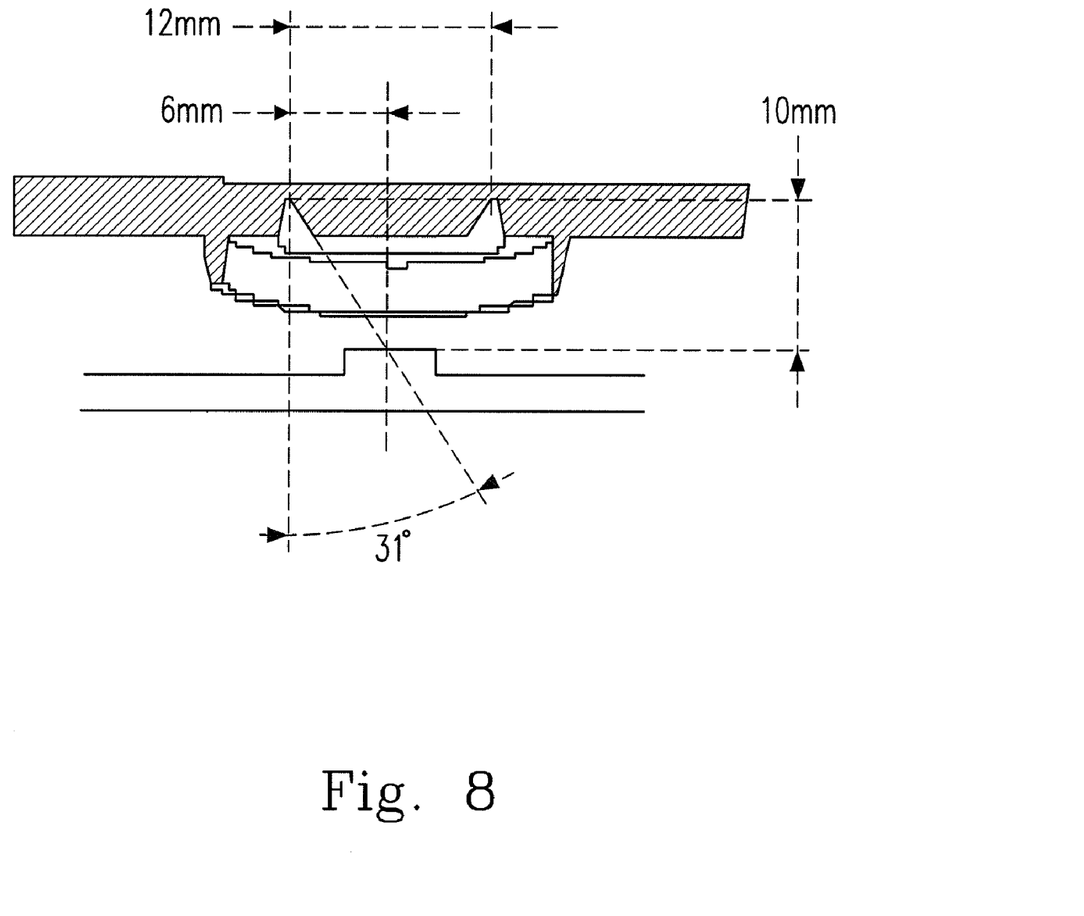
FIG. 8 is a cross-sectional view of the icon representing an electronic mail according to another preferred embodiment of the present invention.

The obtained incident angle $\theta_i$ is 31 degrees. As described above, the draft angle is equal to or larger than the incident angle $\theta_i$, so that it can be designed as 31 degrees or larger than 31 degrees, as shown in FIG. 8. Preferably, the incident angle $\theta_i$ of the present invention is ranged from 30 degrees to 45 degrees.

Furthermore, as shown in FIG. 7, since the normal (N') is parallel to the vertical distance H and the optic axis (op') serves as a transversal line therebetween, the incident angle $\theta_i'$ defined by the intersection of the optic axis (op') and the vertical distance H is an alternate angle of the incident angle $\theta_i$. That is to say, the incident angle $\theta_i'$ is equal to the incident angle $\theta_i$.

Since the optic axis (op'), the vertical distance H and a half of the distance W (W/2) constitute a right triangle, the incident angle $\theta_i'$ can also be obtained by performing a sine function operation, a cosine function operation, a cotangent function operation, a secant function operation or a cosecant function operation.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for obtaining an incident angle $\theta_i$ used in a panel having at least one icon, comprising steps of:
    providing a panel having an icon, wherein the icon has a plurality of protrusions, each of the protrusion has a plurality of edges and a plurality of draft angles at inner and outer sides of the edges, and wherein a light-emitting source is disposed under the icon;
    obtaining a distance W between two centers of two bottoms of two trenches formed at two sides of one of the plurality of protrusions;
    obtaining a half of the distance W;
    obtaining a vertical distance H between the light-emitting source and a center of the distance W;
    performing an inverse trigonometric function operation for the half of the distance W over the vertical distance H so as to obtain the incident angle $\theta_i$; and
    causing each of the draft angles to be one of angles equal to and larger than the incident angle $\theta_i$ to make a light on the icon of the panel even.

2. A method as claimed in claim 1, wherein the at least one icon is one selected from a group consisting of a numeral, a character, a symbol and a combination thereof.

3. A method as claimed in claim 1, wherein the light-emitting source is a light-emitting diode.

4. A method as claimed in claim 1, wherein the distance W is a horizontal distance.

5. A method as claimed in claim 4, wherein the distance W is ranged from 6 mm to 12 mm.

6. A method as claimed in claim 1, wherein the vertical distance H is ranged from 5 mm to 10 mm.

7. A method as claimed in claim 1, wherein when an arctangent function is used in the inverse trigonometric function operation, $\theta_i = \text{Tan}^{-1}(W/2)/H$.

8. A method as claimed in claim 1, wherein the step of performing the inverse trigonometric function operation is performed by using an electronic operational device.

9. A method as claimed in claim 1, wherein the incident angle $\theta_i$ is ranged from 30 degrees to 45 degrees.

10. A method as claimed in claim 1, wherein the incident angle $\theta_i$ is ranged from 30 degrees to 45 degrees.

11. A method for obtaining an incident angle $\theta_i$ used in a panel having at least one icon, comprising steps of:
    providing an icon, the icon has a plurality of protrusions, each of the protrusion having a plurality of edges and a plurality of draft angles at inner and outer sides of the edges, and wherein a light-emitting source is disposed under the icon;
    obtaining a distance W between two centers of two bottoms of two trenches formed at two sides of one of the plurality of protrusions;
    obtaining a half of the distance W;
    obtaining a vertical distance H between the light-emitting source and a center of the distance W;
    calculating the incident angle $\theta_i$ based on the half of the distance W and the vertical distance H; and
    causing each the draft angles to be one of angles equal to and larger than the incident angle $\theta_i$ to make a light on the icon of the panel even.

12. A method as claimed in claim 11, wherein the at least one icon is one selected from a group consisting of a numeral, a character, a symbol and a combination thereof.

13. A method as claimed in claim 11, wherein the light-emitting source is a light-emitting diode.

14. A method as claimed in claim 11, wherein the distance W is ranged from 6 mm to 12 mm.

15. A method as claimed in claim 11, wherein the vertical distance H is ranged from 5 mm to 10 mm.

16. A method as claimed in claim 11, wherein the step of calculating the incident angle $\theta_i$ is performed by using an electronic operational device.

* * * * *